S. Nicolson.

Wood Pavement.

No. 1,583. Reissued Dec. 1, 1863.

Witnesses:

Daniel Goodwin Jr.
Stephen A. Goodwin

Inventor:

Samuel Nicolson

S. Nicolson.

Wood Pavement.

No. 1,583. Reissued Dec. 1, 1863.

Witnesses:
David Goodwin Jr
Ephen A. Goodwin

Inventor:
Samuel Nicolson

UNITED STATES PATENT OFFICE.

SAMUEL NICOLSON, OF BOSTON, MASSACHUSETTS.

IMPROVEMENT IN WOODEN PAVEMENTS.

Specification forming part of Letters Patent No. 11,491, dated August 8, 1854; Reissue No. 1,583, dated December 1, 1863.

*To all whom it may concern:*

Be it known that the following is a full, clear, and exact description of the new and useful Improved Wooden Pavement invented by me, SAMUEL NICOLSON, of Boston, in the State of Massachusetts, and for which Letters Patent were granted to me on the 8th day of August, in the year of our Lord 1854, the said Letters Patent having been surrendered for the purpose of describing the same invention and pointing out in what it consists in more clear, full, and exact terms than was done in the original specifications.

The nature and object of my invention is the creation and constructing of such a wooden pavement for streets and roadways as shall be comparatively permanent and durable by so uniting and combining all its parts, both superstructure and foundation, so as to provide against the slipping of the horses' feet, against noise, against unequal wear, and against rot on and from the top surface, and against rot and consequent sinking away from below, or the working of the gravel or other material under the blocks so as to cause inequalities in the surface.

For a clear understanding of the manner of constructing my improved wooden pavement I refer to the accompanying drawings, with corresponding letters of reference, making part of these specifications, of which—

Figure 2:
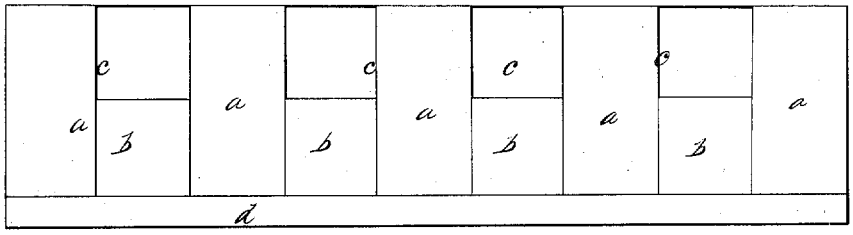
Figure 1:
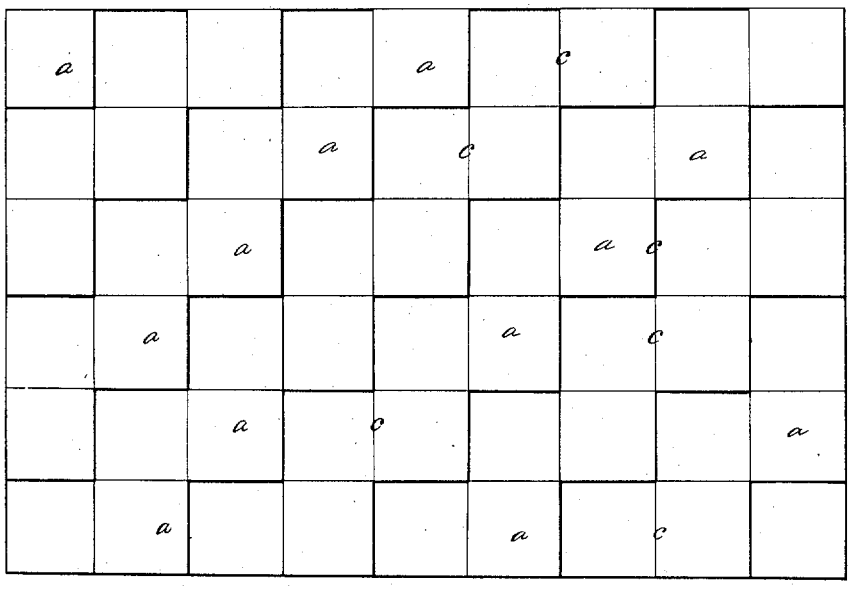
Figure 1:
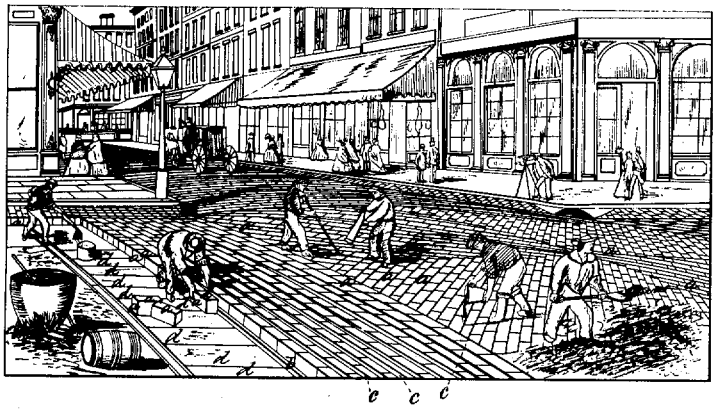
Figure 2:
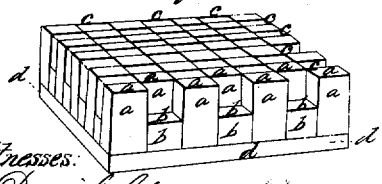
Figure 3:
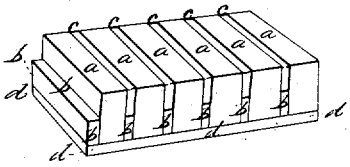

Drawing No. I, Figure 1, represents a top view of the first plan of said pavement, and Fig. 2 of the same drawing represents a transverse and vertical section of the same; and Fig. 1 of Drawing No. II represents a perspective view of the said pavement constructed after the second plan or modification; and Fig. 2, Drawing No. II, a further perspective view of the said pavement on the first plan; and Fig. 3, Drawing No. II, a further perspective view of the said pavement on the second plan.

The earth of a roadway upon which my improved wooden pavement is to be constructed must first be suitably graded in any of the usual and well-known methods in order to prepare it for the reception of such pavement. When the street or roadway has been thus prepared for the reception of my pavement, I then cover the surface of the roadway or bed with tarred paper, or with lime, mortar, or hydraulic cement, laid over it about two inches in thickness, or with a cheap flooring, which may be also covered with tar, or any other preventive to moisture can be used for said foundation or support, the object and effect of such support or foundation being to prevent moisture from being absorbed from the ground by the wooden blocks. Said foundation or support is designated in said drawings by the letters *d d*.

In further carrying out my invention I make use of two sets or series, *a a a b b b*, of wooden blocks. They are cut with parallel sides, lines, or surfaces from joist or timber, about four inches square or of other suitable shape and dimensions in cross-sections, the longer blocks *a a a* being made about eight inches in length, while the shorter blocks, or those represented at *b b b*, are formed about half the length of the others. These blocks are placed end upward upon said foundation or support, and are arranged both transversely and longitudinally so that the long and the short blocks shall be arranged alternately in each direction or run as seen in the drawings. Such an arrangement of them leaves cavities *c c c* between the said blocks, each of the said cells being bounded by four of the larger blocks and having its bottom formed by one of the shorter blocks. The upper ends of the long blocks, when thus placed together, present a checkered or tessellated appearance, and they will exhibit the open spaces arranged together in a similar manner. Into each of these cells a small quantity or layer of coarse salt may be put. These cells are filled up with small broken stone or coarse clean gravel, the whole being firmly rammed, so that the upper surface of the mass in each cell shall be firm and level. Next, mineral or vegetable tar or pitch is to be poured over the whole surface of the pavement and into the cells or cavities containing the broken stone or gravel, so as to penetrate entirely between the pieces of stone or gravel and cement them together. The tar, permeating into the squares containing the broken stone or gravel, will cause the masses of the same to adhere firmly to the surrounding blocks, and will admit of expansion of the mass by the weight of the wheels of carriages in passing over them, such expansion serving to fill up the space which might otherwise be made by shrinkage of the wooden blocks.

In order to prevent the blocks from being forced below one another in some of my modes of constructing the pavement they may be pinned together with wooden pins extending from block to block.

Instead of the broken stone and tar any other suitable cementing material or cement may be employed in the cells. I prefer, however, common tar, or pitch and gravel, or broken stone, as such in practice has been found to operate to great advantage and to be very durable in use, and to present a surface over which it is very difficult for a horse's foot to slip or slide, as it will on ordinary wooden pavement when its surface is wet or covered with mud. The shorter blocks *b b b* serve to uphold the masses of cement and stone in the cells or cavities, so as to prevent particles o the broken stone or gravel from working under the longer blocks and thus upheaving them and causing inequalities in the pavement, and when such masses are compacted by any blow upon them or the rolling of wheels over them, instead of being pressed down so as to slide down between the blocks, they are made to spread laterally and thereby completely close up the joints between the blocks and themselves, so as to prevent water from passing down into the joints between the blocks. As the salt will slowly melt it will penetrate into the wood and aid in preserving it from decay.

My invention may be carried out in another form—that is to say, as seen in Fig. 1 and Fig. 3, Drawing No. II. The long blocks may be arranged side by side and in rows transversely of the roadway, and with spaces about one inch in thickness between each two rows of them, in each of which spaces a strip of board may be introduced edgewise or vertical, the width of the board being equal to about half the length of the block. These boards being made to rest on the foundation or support resting on he surface of the ground, create with the rows of the blocks long cells or grooves extending transversely across the roadway, such cells or grooves being subsequently filled with broken stone or gravel, and tar or cement.

I would remark as to the great durability of my pavement that for the purpose of experiment I have had some of it in use for six years before the month of March, 1854, on a road over which the travel has been very great.

Some of the advantages of my improved pavement are to be found in the hold that it offers to the feet of horses; in the little noise that is produced by carriages in passing over it—the absence of noise resulting from the peculiar character of the materials of which the pavement is composed. This pavement is also very durable, its durability being occasioned by reason of the friction of the travel over it being produced upon the slightly elastic extremities of the fibers of the wooden blocks. Moisture is excluded from the wood by the materials employed for the support of the blocks; also by the preventives; also by the tarry covering which is placed over the top surface, as hereinbefore described.

My pavement has the advantage of great cleanliness in comparison with most other pavements, because in the first place as there is very little wear of its upper surface, very little dust is likely to form upon it, and such as does form is quickly removed therefrom by rains and winds.

Having thus fully described the parts and combination of parts, and the operation of my improved wooden pavement, and shown various modes in which the same may be constructed and made to operate without changing the principle of its construction and operation, what I claim therein as my invention, and desire to secure by Letters Patent, is—

The so combining or arranging the foundation or support, or its equivalent, of said wooden pavement resting on the roadway surface or bed, substantially as herein described, with said long and short blocks above described, or their equivalents, which said blocks are combined in such manner as that partitions shall be made, leaving cells or channels between them, with a wooden bottom formed by the shorter blocks some distance above the lower end of the longer blocks for the reception of the broken stone or gravel and tar or other like material, and also combined with such cells or channels filled with broken stone, gravel, and tar, or other like material, substantially as herein described, having such wooden bottom to rest upon, substantially as herein described, whereby the particles of pounded stone or gravel are prevented from working under the lower ends of the longer blocks, and whereby water is prevented from passing from the surface of the pavement downward through the joints of said wooden blocks, and also moisture is prevented from being absorbed upward from the ground by said wooden blocks, substantially as herein described.

SAMUEL NICOLSON.

Witnesses:

STEPHEN A. GOODWIN,
DANIEL GOODWIN, Jr.